United States Patent [19]

Schult

[11] 4,339,277

[45] Jul. 13, 1982

[54] SOLID SULFUR-EXTENDED ASPHALT COMPOSITION AND METHOD AND APPARATUS THEREFOR

[76] Inventor: Hans E. Schult, 109 Shoshone Dr., Apt. C, East Peoria, Ill. 61611

[21] Appl. No.: 189,373

[22] Filed: Sep. 22, 1980

[51] Int. Cl.³ .............................................. C08L 95/00
[52] U.S. Cl. ................................................ 106/275
[58] Field of Search ................................ 106/275, 274

[56] References Cited

U.S. PATENT DOCUMENTS

| | | | |
|---|---|---|---|
| 49,567 | 8/1865 | Spooner | 106/274 |
| 403,548 | 5/1889 | Olsen | 106/274 |
| 480,234 | 8/1892 | Dubbs | 106/273 |
| 1,063,899 | 6/1913 | Westergard | 106/274 |
| 1,353,003 | 9/1920 | White et al. | 106/274 |
| 2,182,837 | 12/1939 | Bacon | 94/23 |
| 2,340,640 | 2/1944 | Burk | 106/273 |
| 2,478,162 | 8/1949 | Sommer | 106/273 |
| 3,738,853 | 6/1973 | Kopyillem et al. | 106/274 |
| 3,960,585 | 6/1976 | Gaw | 106/274 |
| 4,024,076 | 5/1977 | Miyake | 252/422 |
| 4,079,158 | 3/1978 | Kennepohl et al. | 428/143 |
| 4,135,022 | 1/1979 | Kennepohl et al. | 428/143 |
| 4,339,547 | 12/1980 | McBee et al. | 106/274 |

FOREIGN PATENT DOCUMENTS

| | | |
|---|---|---|
| 755999 | 4/1967 | Canada . |
| 945416 | 4/1974 | Canada . |
| 1042610 | 11/1978 | Canada . |
| 610629 | 10/1948 | United Kingdom . |
| 1363706 | 8/1974 | United Kingdom . |

*Primary Examiner*—Theodore Morris
*Attorney, Agent, or Firm*—McCaleb, Lucas & Brugman

[57] ABSTRACT

An improved sulfur-extended asphalt composition and method for use in making compacted bituminous concrete, whereby solid sulfur, preferably in powdered form, is added to liquid asphalt on substantially a 1:1 weight basis, the asphalt comprising less than 3.1% of the weight of the total bituminous concrete mixture. The solid sulfur is melted by the heat present in the molten asphalt thereby lessening the overall energy consumption and eliminating the need for any liquid sulfur-related heating equipment. The overall binder content of the resultant bituminous concrete is varied so as to both maintain the 1:1 sulfur-replacement-of-asphalt relationship utilized with this invention, and to reduce the occurrence of air voids. Such a 1:1 replacement relationship provides economic efficiencies in bituminous concrete production not previously obtainable. The resultant sulfur-extended bituminous concrete when compacted provides substantially increased mechanical strengths over conventional asphalt mix designs. A solid sulfur mixing and blending apparatus is disclosed for use with asphalt batch plants to accommodate the present sulfur-extended asphalt composition and method.

7 Claims, 4 Drawing Figures

SOLID SULFUR-EXTENDED ASPHALT COMPOSITION AND METHOD AND APPARATUS THEREFOR

BACKGROUND OF THE INVENTION

1. Field of the Invention

This invention relates to bituminous concrete and the methods of making same, and more specifically to sulfur-extended asphalt mix designs, processes, and apparatus for use with the same.

2. Description of Prior Art

Preliminarily, as used herein, the terms "asphalt" or "asphalt cement" shall mean any of the heavy petroleum oils or tar or pitch; "bituminous contrete" shall mean a composition of asphalt cement and aggregate (such as gravel, sand, mineral fillers, etc.); and "sulfer-extended asphalt" shall mean a mixture of sulfur and asphalt cement. Additionally, the term "binder content" shall mean, depending upon the context, either the weight of the asphalt cement alone or the weight of the sulfur-extended asphalt mixture, expressed as a weight percentage of the total weight of the bituminous concrete mixture. The units of measurement for the results of the well-known Marshall Flow test noted herein are in one one-hundreths of an inch. For example, if a bituminous concrete test specimen deforms 0.15 inch, the Marshall Flow value is noted as 15.

There have been various prior attempts to eliminate dependence upon petroleum in the manufacture of compacted bituminous concrete or so-called blacktop by using sulfur-extended asphalt compositions. The majority of such teachings require that molten sulfur be utilized in making the sulfur-extended asphalt. However, such prior art liquid sulfur-extended asphalt methods require costly and specialized equipment to maintain the elevated temperature of the molten sulfur (at 246° F. or more) and also to properly blend it with the liquid asphalt cement. In a typical asphalt batch plant, the use of liquid sulfur would require heated liquid sulfur storage tanks, supplemental burners, and associated heated valves, pumps and piping equipment. Additionally, since the molten sulfur and asphalt are preblended before being introduced into the asphalt weigh bucket and finally into the the heated aggregate to form the bituminous concrete, costly high shear energy-type blending units must be used due to liquid sulfur's relatively high viscosity. These include colloid mills, gear pumps, high speed stirrers, propeller mixers, static mixers, or other such devices.

Additionally, the known prior art mix designs for liquid sulfur-extended asphalt typically require that the asphalt be replaced by liquid sulfur on an equal volume basis. This means then that, since sulfur is twice the weight of asphalt, two weight units of sulfur must be included for every asphalt unit being replaced. Such a 2:1 weight ratio replacement was primarily used to minimize the high air void contents found in many sulfur-extended bituminous concrete mixtures of the prior art. Due to the typically prevailing market prices for liquid sulfur and asphalt cement, such prior art liquid sulfur-extended mix designs were not satisfactory from a cost savings standpoint. Thus, they were not widely utilized. The latter is also true because the supply of liquid sulfur has not historically been reliable. Consequently, until the present invention the manufacture of bituminous concrete has remained highly petroleum dependent. Moreover, from an energy consumption standpoint, the extra energy required to maintain molten sulfur at useable liquid states with such prior art mix designs is highly disadvantageous.

There have been prior art attempts to replace liquid asphalt cement by solid sulfur. Such prior art mix designs were also typically produced on an equal volume basis, i.e., a sulfur-to-asphalt weight ratio of 1.75:1, 2:1, or even higher. At such high sulfur concentrations, the resulting pavement product was difficult to compact using conventional rolling techniques. Thus, such prior art designs that were used in relation to highway paving were primarily for repair work. That is, individual segments of asphalt were cast without subsequently being compacted, such as for repairing potholes, for example.

Examples typifying such prior art sulfur-extended asphalt compositions for use in bituminous concrete are disclosed in U.S. Pat. Nos. 2,182,837, 3,738,853, and 3,960,583, British Pat. No. 1,363,706, and Canadian Pat. Nos. 755,999, 945,416 and 1,042,610.

SUMMARY OF THE INVENTION

The present invention overcomes these and other problems of the prior art by providing an improved sulfur-extended asphalt composition for use in making compacted bituminous concrete in which the asphalt cement is replaced by solid sulfur on a 1:1 weight basis and the heat present in the molten asphalt is used to melt the solid sulfur. With the present invention the asphalt comprises less than 3.1% of the total weight of the bituminous concrete mixture. The overall binder content of the bituminous concrete mixture is selectively varied to assure both use of the desired 1:1 replacement ratio and maintenance of proper paving design criteria.

Through use of solid sulfur, preferably in powdered or crushed form, the expensive liquid sulfur handling equipment and high shear energy pre-blending equipment of the prior art mix designs are eliminated. The present invention's replacement of liquid asphalt by solid sulfur on a 1:1 weight basis, rather than the prevailing 2:1 or more weight basis of the prior art mix designs, makes use of sulfur-extended asphalt compositions highly attractive from a cost standpoint. This is because solid sulfur is substantially less expensive than heated liquid sulfur on a delivered-ton basis. Further, the present invention assures that no extra energy is required to heat the solid sulfur since it is melted on-site at the asphalt batch plant by pre-blending it with the heated liquid asphalt directly in the heated asphalt weigh bucket. This is contrary to the prior art liquid sulfur mix designs where the elemental sulfur was first separately melted to a liquid state and then maintained at an elevated temperature, all requiring additional energy. In addition to reduced heat energy consumption, the present invention also provides an economical sulfur-extended asphalt composition by which petroleum dependence is substantially reduced, i.e., almost in half.

A specialized mixing apparatus for use with the conventional heated asphalt cement weigh bucket of a typical asphalt batch plant is also disclosed. This mixing apparatus can be incorporated as an inexpensive modification to an existing asphalt plant or built integrally with new asphalt weigh buckets so as to accommodate the present solid sulfur-extended asphalt process.

Thus, it is a primary object of the present invention to provide a sulfur-extended asphalt composition in which the asphalt is replaced by solid sulfur on a cost-efficient, substantially 1:1 weight basis.

It is another object of the present invention to provide special mixing apparatus for use with a conventional asphalt batch plant to accommodate the blending of solid powdered sulfur with liquid asphalt cement in a heated asphalt weigh bucket.

It is still another object to provide a sulfur-extended asphalt blending process whereby the total energy consumed is substantially reduced from that of conventional methods.

It is a further object to provide a solid sulfur-extended asphalt mix design which eliminates costly liquid sulfur-related equipment required by prior art methods.

It is yet another object to provide a method for making sulfur-extended bituminous concrete whereby a substantially 1:1 sulfur-to-asphalt replacement ratio may be regularly utilized by adjusting the overall binder content.

It is a still further object to reduce harmful sulfur emissions from a sulfur-extended asphalt process.

The means by which the foregoing and other objects of the present invention are accomplished and the manner of their accomplishment will be readily understood from the following specification upon reference to the accompanying drawings, in which.

EXAMPLE 1

Figure 1:
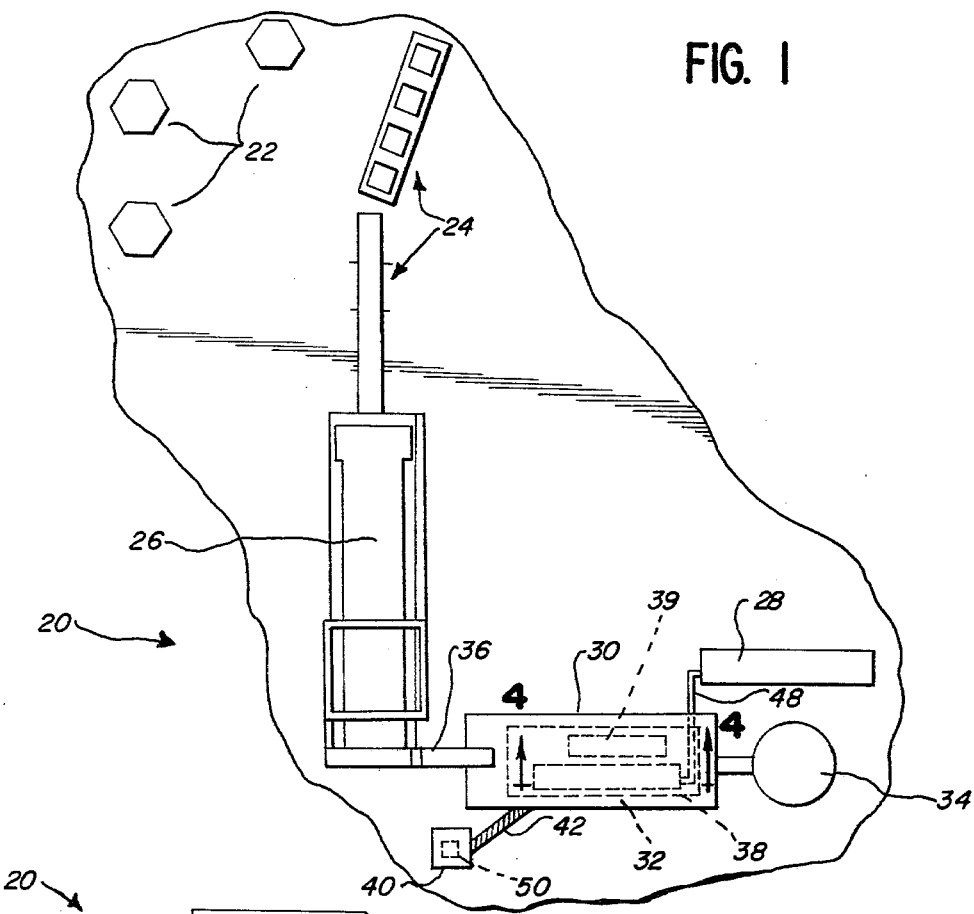
FIG. 1 is a schematic layout of a typical asphalt batch plant as modified to accommodate the present invention.

Preliminarily, it should be understood that a conventional process for making bituminous concrete typically includes the following steps as listed. Asphalt cement is heated to a liquid and maintained at approximately 300° F. A quantity of aggregate in the form of sand, limestone, gravel, or slag is heated to a temperature of approximately 350° F. for a period of time long enough to be completely dried. The dried aggregate is then screened, weighed, and proportioned in a conventional aggregate weigh hopper and mixed with the heated asphalt cement in a blending apparatus such as a pugmill. The resulting bituminous concrete mixture made by such a conventional process generally has a temperature in the range of from 280° F. to 290° F. when leaving the batch plant site. In using this conventional process, the heat energy required to produce one ton of hot mix bituminous concrete is on the order of 350,000 BTU's.

The pavement laying characteristics or so-called "lay down" criteria for a conventional bituminous concrete mix utilizing 100% asphalt cement, i.e., one not extended by sulfur, and listed as Example 1 in the Chart 1 below. As shown there, with an optimum 5% binder content as used in a typical conventional mix and due to the particular aggregate used, and with the binder being 100% asphalt cement, the finished bituminous concrete mix had the following characteristics: a 4.78% air void content, a bulk specific gravity of 2.39, a Marshall Flow of 12.5, and relatively low Marshall Stability rates of 1,400 lbs./in.$^2$ @ 24 hours and 1,450 lbs./in.$^2$ @ seven days.

EXAMPLE 2

Further, the usual process for making a typical prior art bituminous concrete mix utilizing liquid sulfur-extended asphalt includes the following steps as listed. The liquid asphalt cement is heated to a temperature of 300° F. and is introduced into a special high shear energy-type preblending unit, such as a colloid mill, for example. At the same time, liquid sulfur maintained at a temperature of at least 280° F. is introduced into the colloid mill through special heat-jacketed delivery lines and blended with the asphalt. This liquid asphalt extension, i.e., replacement, by liquid sulfur is done on essentially an equal volume basis. Thus, two weight units of sulfur are substituted for one weight unit of liquid asphalt cement. Meanwhile, the aggregate is heated and dried to a temperature of approximately 350° F. The total liquid sulfur-extended asphalt blend is proportionately weighed and introduced into the pugmill where the heated aggregate and sulfur-extended asphalt are then mixed.

The final mixture of bituminous concrete made by such a liquid sulfur-extended asphalt process of the prior art is typically at a temperature of 280°–290° F. when leaving the plant site. The heat energy necessary to maintain sulfur in liquid form for subsequent use with liquid asphalt is on the order of 570,920 BTU's per ton of sulfur. This, of course, does not include any heat energy required when the solid sulfur is melted off-site and subsequently transported and stored in heated liquid form at the asphalt batch plant until needed.

The lay down characteristics for such a bituminous concrete mixture utilizing the typical liquid sulfur-extended asphalt technology of the prior art are listed as Example 2 in Chart 1. A test sample was made according to the prior art's equal volume substitution ratio of liquid sulfur to liquid asphalt, i.e., a 2:1 weight ratio substitution. It will be noted that the total sulfur-extended binder content of this test sample was raised to 6.3% which relates to the 5% binder of the conventional mix of Example 1. This is because under existing sulfur-extended asphalt technology, binder content requirements for sulfur-extended asphalt paving are greater than for conventional paving. These higher binder requirements, in turn, result primarily because of the approximately 2:1 weight and specific gravity ratio between the sulfur and asphalt.

More specifically, the Sulphur Development Institute of Canada specifies that the optimum sulfur-extended asphalt binder may be determined from a conventional asphalt cement mix design by using the following formula:

$$\text{Equivalent Sulfur-Extended Binder Content} = A\left(\frac{100R}{100R - (S)(R - G)}\right)$$

where, (with the values for Example 2 of Chart 1 shown in parenthesis):

A = Weight percentage of Asphalt Cement in a Conventional Mix (5.0)
R = Sulfur to Asphalt Binder Ratio (2.0)
S = Weight percentage of Sulfur in the Sulfur-Extended Asphalt Binder (42.0)
G = Specific Gravity of the Asphalt (1.013).

The resulting sulfur-extended binder content for Example 2 then is 6.3%. In any event, the results for such a liquid sulfur-extended mix with a 6.3% binder content are a 2.6% air void content, a 24 hour Marshall Stability rate of 2120 lbs./in.$^2$, and a Marshall Flow of 12.5.

DESCRIPTION OF PREFERRED EMBODIMENT

In contrast, the improved sulfur-extended asphalt mix design of the present invention utilizes solid sulfur. The preferred process by which bituminous concrete is made from the present invention includes the following steps. The asphalt cement is heated to a temperature of 300° F. and maintained there. The aggregate is heated and dried at a temperature preferably no greater than 305° F. The purpose for this maximum aggregate drying temperature will be explained later herein. Elemental solid sulfur in bulk form is first pulverized and then introduced in a substantially crushed form into the heated liquid asphalt cement weigh bucket.

The present invention's solid sulfur extension of asphalt cement is accomplished on substantially a 1:1 weight basis, the latter being assured through use of a variable binder content. That is, one weight unit of solid sulfur is added to one weight unit of liquid asphalt cement as weighed in the asphalt weigh bucket. The heat energy present in the liquid asphalt cement held in the asphalt weigh bucket supplies a major part of the heat required to melt the powdered solid sulfur. Only a minor portion of the energy needed for heating of the liquid asphalt, the sulfur, or the mixture of solid sulfur and liquid asphalt is required to be supplied by the heated oil chamber 52 in the asphalt weigh bucket 38.

As the powdered sulfur is introduced into the heated asphalt weigh bucket it is simultaneously mixed with the liquid asphalt and dispersed throughout the same. At this stage, the now completely liquid mixture of heated sulfur and asphalt cement will have a temperature of approximately 270° F. The blended liquid mixture of sulfur and asphalt cement is then introduced into and blended with the heated aggregate in the asphalt batch plant's pugmill. So as to obtain desirable laydown criteria, the binder content (weight percentage of sulfur and asphalt blend) is selected, i.e., varied, so that the asphalt remains less than 3.1% of the total weight of the bituminous concrete mix and so that the desirable 1:1 replacement ratio may be used. The aggregate comprises from 93-95% by weight of the total mix.

The final mixture of bituminous concrete made by the improved process of the present invention will be at a temperature of approximately 280° F. to 285° F. when leaving the plant site. It has been found that bituminous concrete made according to the process of the present invention is no more difficult to compact into pavement than conventional non-extended asphalt mix designs. Contrary to prior art sulfur-extended mix designs, no casting procedures are required with the present invention. Due to the fact that the heated aggregate of the present invention is dried to a lower than usual temperature, the heat energy required to produce one ton of the present invention's bituminous concrete is on the order of only 300,000 BTU's.

Any harmful gases such as $H_2S$ (hydrogen sulfide) and $SO_2$ (sulfur dioxide) that may be emitted at the plant site due to the mixing of solid sulfur and liquid asphalt are substantially minimized for two reasons. First, the ambient temperature of the powdered sulfur slightly lowers rather than raises the temperature of the heated asphalt which is held at 300° F. prior to blending. Second, when the lower-temperature blend of liquid sulfur and asphalt is mixed with the higher temperature dried aggregate, the final mix temperature does not rise above that of the aggregate, i.e., approximately 300° F. Thus, at all times the temperature of the resultant bituminous concrete mix is sufficiently below the critical temperature of 309° F., above which $H_2S$ and $SO_2$ may be emitted. Accordingly, no harmful emissions other than a slight sulfur odor will result with use of the present invention.

EXAMPLE 3

A sample of bituminous concrete utilizing the solid sulfur-extended asphalt cement process of the present invention is shown as Example 3 in Chart 1. With this test sample, the conventional 5% binder content was maintained as with Example 1. However, the preferred 1:1 sulfur-to-asphalt substitution ratio was utilized. On a weight basis, 42% of the binder content was sulfur, 58% of the binder content was asphalt, while only 2.90% of the total weight of the total bituminous concrete mix was asphalt.

The test sample for this Example 3 was made by first preheating a convection oven to 300° F. and by maintaining this temperature constant throughout the test. A container having a volume of 0.07 ft. was placed in the oven. A quantity of 1.45 lbs. of liquid asphalt was placed in the container and allowed to reach a temperature of 300° F. A quantity of 1.05 lbs. of powdered solid sulfur was added to the heated asphalt cement and mixed into it for one minute by a propeller-type stirrer operated at 1,000 RPM. The sulfur dissolved completely in 30 seconds and mixing and blending were accomplished in one minute. The blended mixture's temperature dropped to 294° F., evidencing that the heat contained in the liquid asphalt cement can be utilized to melt the solid sulfur with only a minor temperature drop. This solid sulfur-extended asphalt blend was then mixed with aggregate heated to 300° F. The resulting bituminous concrete composition of this Example 3 had a 5.5% air void content, a bulk density of 149.1 lbs./ft.$^3$, a Marshall Stability rate of 3,510 @ 24 hours, and a Marshall Flow rating of 9.0.

More specifically, it is to be noted that the specific heats of sulfur range from 0.167 BTU's/°F./lb. to 0.250 BTU's/°F./lb., while the specific heats for asphalt, stone, and sand are approximately 0.5, 0.5, and 0.4 BTU's/°F./lb. respectively. (The term "specific heat" as used here is defined as heat in BTU's required to raise the temperature of a material one degree Fahrenheit, per pound of material.) Based upon these specific heats, and if the temperature of the asphalt cement is maintained at 300° F., the final temperature of the liquified solid sulfur-extended asphalt cement blend in bulk quantities will have a temperature of approximately 270° F. when ready to be introduced into the heated aggregate. Thus, when mixed with the aggregate heated to 305° F., the temperature for the resultant bituminous concrete mix as it is ready to leave the plant site will be on the order of 280° F. to 285° F. In view of the above, no additional energy source is required to melt the solid sulfur when using the improved process of the present invention.

CHART #1

| Example No. | Sulphur %-Asphalt % | Substitution Ratio | Binder Content | Sulphur-Asphalt (as % of total mix) | % Air Voids | Bulk Density | 24 Hour Marshall Stability Rate | Marshall Flow |
| --- | --- | --- | --- | --- | --- | --- | --- | --- |
| 1 | 0–100 | N.A. | 5.0 | 0–5.0 | 4.78 | 148.6 | 1400 | 12.5 |
| 2 | 42–58 | 2:1 | 6.3 | 2.65–3.65 | 2.60 | 152.8 | 2120 | 12.5 |
| 3 | 42–58 | 1:1 | 5.0 | 2.10–2.90 | 5.5 | 148.0 | 3510 | 9.0 |
| 4 | 45–55 | 1:1 | 5.4 | 2.43–2.97 | 4.8 | 149.1 | 2660 | 10.0 |

EXAMPLE 4

A second sample made according to the present invention is depicted as Example 4 in Chart 1. In this case, the binder content was raised from 5% as with previous Examples 1 and 3 to 5.4%. Again the 1:1 sulfur-to-asphalt substitution ratio was used. This heavier binder content on a weight basis comprised 45% sulfur and 55% asphalt cement. In this instance the asphalt was only 2.97% by weight of the total bituminous concrete mix. Utilizing the same test procedures and equipment as explained in relation to Example 3 above, the resulting bituminous concrete composition had a 4.8% air void content, a bulk density of 149.1 lbs./ft.$^3$, a 24 hour Marshall Stability rate of 2660 lbs./in.$^2$, and a Marshall Flow rating of 10.0.

It will be understood that, for the four Examples described above, the following aggregate comprising a conventional CA-16 crushed limestone surface mixture was used:

| Item | Passing Through | Retained By | % Specifications* of Examples 1–3 | % Specifications* For Example 4 |
| --- | --- | --- | --- | --- |
| Crushed Limestone Rock | ½" | #10 sieve | 60.3% | 60.3% |
| Coarse Sand | #10 sieve | #80 sieve | 20.5% | 20.5% |
| Fine Sand | #80 sieve | #200 sieve | 11.0% | 11.0% |
| Mineral Filler | | minus #200 sieve | 3.2% | 2.8% |
| Binder Content | | | 5.0% | 5.4% |
| | | | 100.0% | 100.0% |

*Percentage of total bituminous concrete mix by weight.

Also, an AC-10 asphalt cement from Shell Oil Company was used throughout.

Other test specimens and their test results using the solid sulfur-extended process of the present invention and having varying binder contents are shown as Examples 5 through 10 in Chart 2 below. It will be understood that any increase in binder content and hence weight of the respective binder content and hence weight of the respective binder was compensated for by reducing the weight percentage of the coarse sand or mineral filler in the aggregate.

to both conventional (100% asphalt) and liquid sulfur-extended mix designs. In fact, in some instances, these solid sulfur-extended mixes are even superior. Accordingly, depending upon the specific lay down characteristics as dictated by field conditions, the air void content and bulk density of a particular mix design are believed to be a function of the amount of binder content in a bituminous concrete mix. It will be understood that with an optimum paving mix, the bulk denisty is preferably within the range from 147–155 lbs./ft.$^3$, and the air void content is preferably no greater than 5.8%. Where a heavier binder content (greater than the conventional 5%) is required with the present invention to accommodate particular road design criteria, the present solid sulfur-extended asphalt mix may still be satisfactorily used such that asphalt can be replaced with sulfur on substantially a 1:1 weight basis. Further, the asphalt is typically less than 3.1% by weight of the total bituminous concrete mix. Thus, by selectively varying the binder content as required and by assuring that the compaction of the bituminous concrete into pavement is accomplished within the conventional temperature range, i.e., 240° F. to 265° F., a satisfactory pavement product can be economically produced according to the present invention.

It is thus apparent that use of the present invention can result in savings of the amount of purchased liquid asphalt of up to 45 percent, yet without any increase in heat energy consumption beyond that required for a conventional bituminous concrete mix. In fact, due to the fact that the aggregate in the present invention is dried at a lower temperature, the total energy utilized for finished product on a per-ton basis is somewhat less than that for a conventional mix. Also, the present invention overcomes the high cost of energy inherent in prior art liquid sulfur-extended asphalt mix designs by avoiding the extra energy needed to melt, transfer, blend, or store the liquid sulfur.

Turning now to a description of the apparatus necessary to perform the process of the present invention, there is shown in FIG. 1 a schematic-type plan view of the well-known asphalt batch plant, generally denoted by reference numeral 20. The asphalt plant 20 includes aggregate stockpiles 22, an aggregate feed mechanism 24, an aggregate dryer 26 having a combustion chamber (not shown), a heated asphalt storage tank 28 having supplemental burners (not shown), a tower support structure 30, a pugmill apparatus 32 mounted on the

CHART 2

| Example No. | Sulphur %-Asphalt % | Substitution Ratio | Binder Content | Sulphur-Asphalt (as % of total mix) | % Air Voids | Bulk Density | 24 Hour Marshall Stability Rate | Marshall Flow |
| --- | --- | --- | --- | --- | --- | --- | --- | --- |
| 5 | 42–58 | 1:1 | 5.20 | 2.18–3.01 | 5.0 | 148.8 | 1260 | 6.0 |
| 6 | 42–58 | 1:1 | 5.20 | 2.18–3.01 | 4.4 | 149.6 | 2413 | 6.5 |
| 7 | 42–58 | 1:1 | 5.20 | 2.18–3.02 | 5.60 | 147.8 | 2340 | 6.7 |
| 8 | 42–58 | 1:1 | 5.20 | 2.18–3.02 | 5.5 | 151.7 | 2180 | 9.0 |
| 9 | 45–55 | 1:1 | 5.20 | 2.34–2.86 | 5.8 | 147.5 | 2580 | 7.0 |
| 10 | 45–55 | 1:1 | 5.60 | 2.52–3.08 | 5.7 | 147.7 | 2340 | 10.0 |

As can be seen from Charts 1 and 2, solid sulfur-extended asphalt mix designs made according to the present invention exhibit similar properties as compared tower 30 and used to mix the various constituent materials, a silo 34 for storing mineral filler, a hot elevator mechanism 36 for transferring the dried aggregate from the dryer to a series of screens 37 which size it, an aggregate weigh hopper 39 for weighing the sized and heated aggregate, and a heated asphalt weigh bucket 38 supported off the tower 30 by scales (not shown) adjacent the pugmill 32. The batch plant 20 also includes a solid sulfur bulk storage bin 40 and a screw auger or vane feeder type mechanism 42. The auger 42 is utilized to transfer the solid sulfur from a sulfur crusher device 50 to the asphalt weigh bucket 38. The asphalt plant's usual pollution control mechanism, such as a bag collector, for example, has been omitted in FIGS. 1 and 2 for purposes of better viewing.

Figure 2:
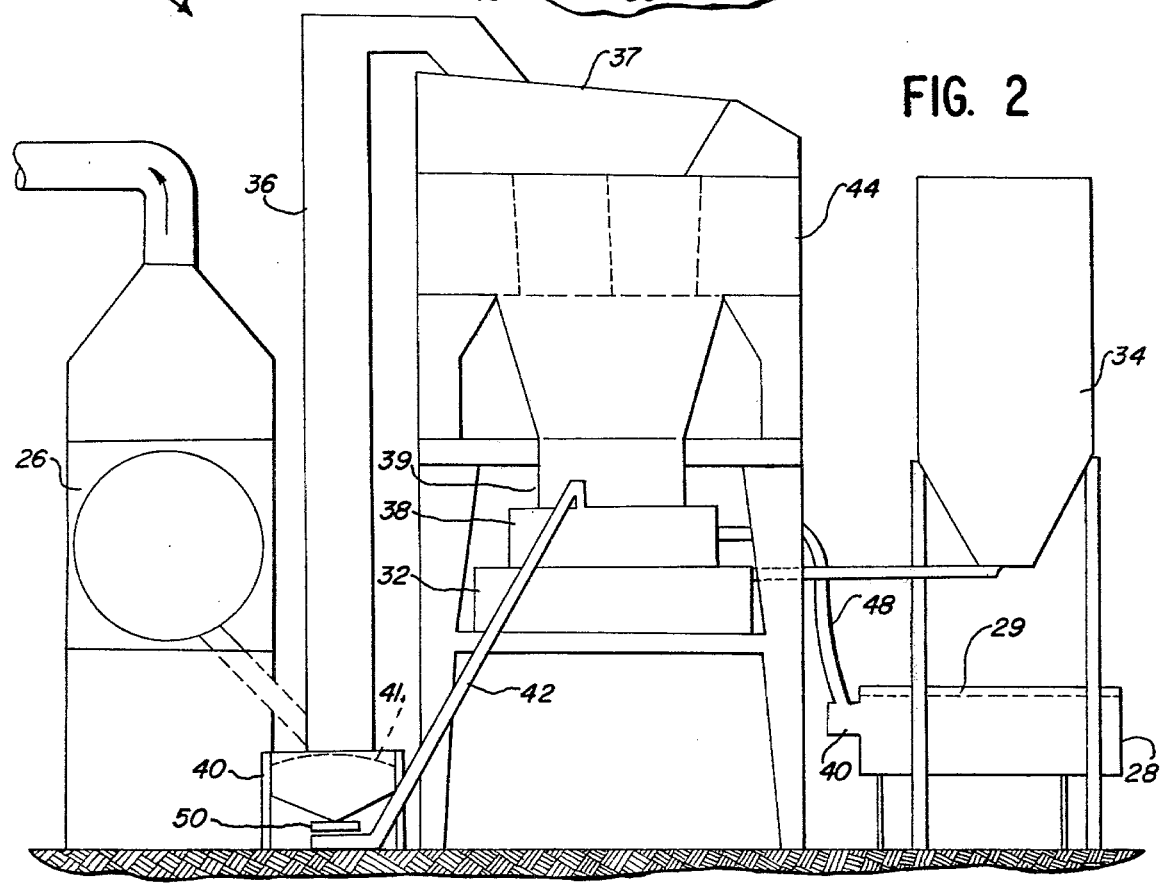
FIG. 2 is a front elevation view of the asphalt batch plant shown in FIG. 1.

As best seen in FIG. 2, the tower 30 also includes elevated aggregate storage containers 44 which transfer sized, heated aggregate into the aggregate weigh hopper 39. The asphalt storage tank 28 has a pump 46 for transferring liquid asphalt 29 from tank 28 through a delivery line 48 into the asphalt weigh bucket 38. Since the asphalt weigh bucket 38 is connected to a scale (not shown) in a wellknown manner, it is capable of weighing any ingredients placed therein. In this manner, the scale-connected asphalt weigh bucket 38 can be used to proportion and mix the solid sulfur 41 and the liquid asphalt 29. It will be understood that both the aggregate weigh hopper 39 and asphalt weigh bucket 38 feed into the pugmill 32.

Figure 4:
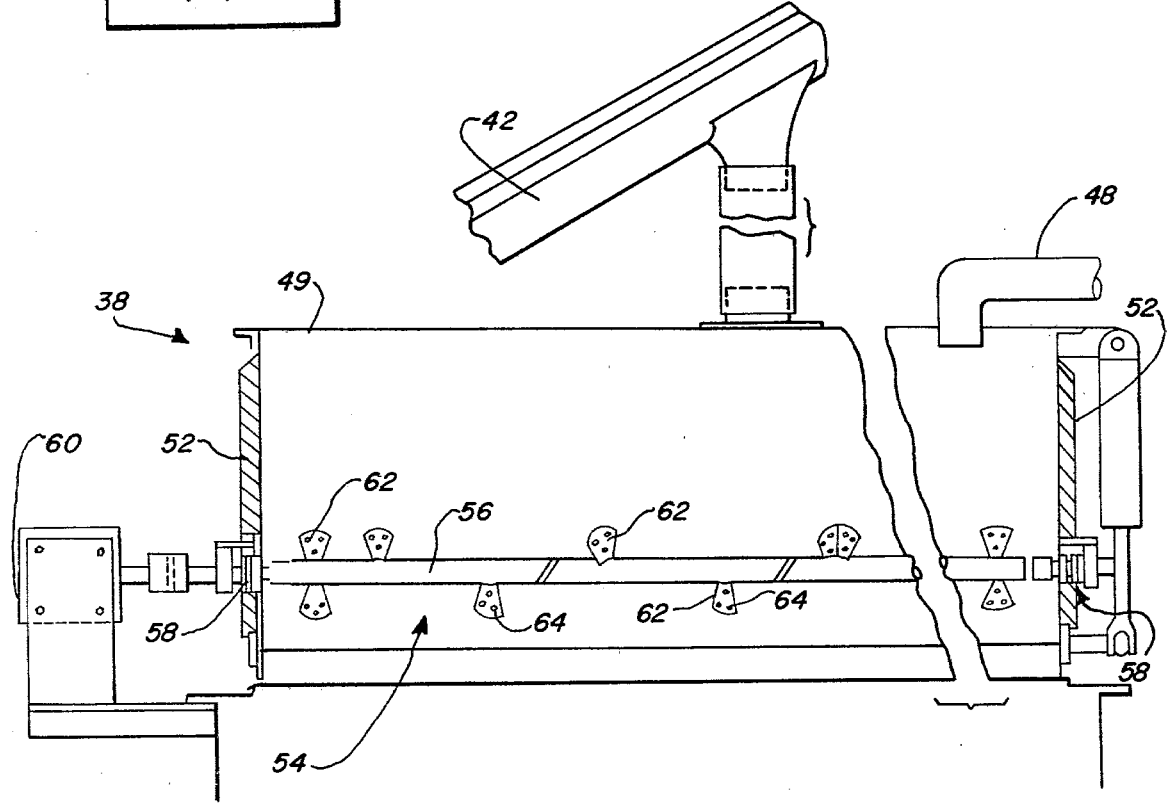
FIG. 4 is a section view of the mixing apparatus of the present invention, taken along lines 4—4 of FIG. 1.

As seen in FIG. 4, the asphalt weigh bucket 38 is hot-oil jacketed in a well-known manner. That is, it is surrounded by heated oil chambers 52 which maintain the desired temperature within the asphalt weigh bucket 38, preferably at 300° F. with the present invention. The sulfur feeder 42 and asphalt delivery line 48 are respectively connected to the top cover panel 49 of the weigh bucket 38. The latter is outfitted with a special mixing apparatus, generally denoted by reference numeral 54. This mixing apparatus 54 includes a shaft 56 which is journalled within bearings 58 on each end wall of bucket 38. The shaft 56 is rotatably driven by a motor 60 mounted exteriorly of the weigh bucket 38. A series of paddle members 62 are mounted along the shaft 56. A plurality of paddle holes 64 are formed on the paddles 62 to effect the proper mixing action within the weigh bucket 38 when the paddle shaft 56 is rotated by motor 60.

Figure 3:
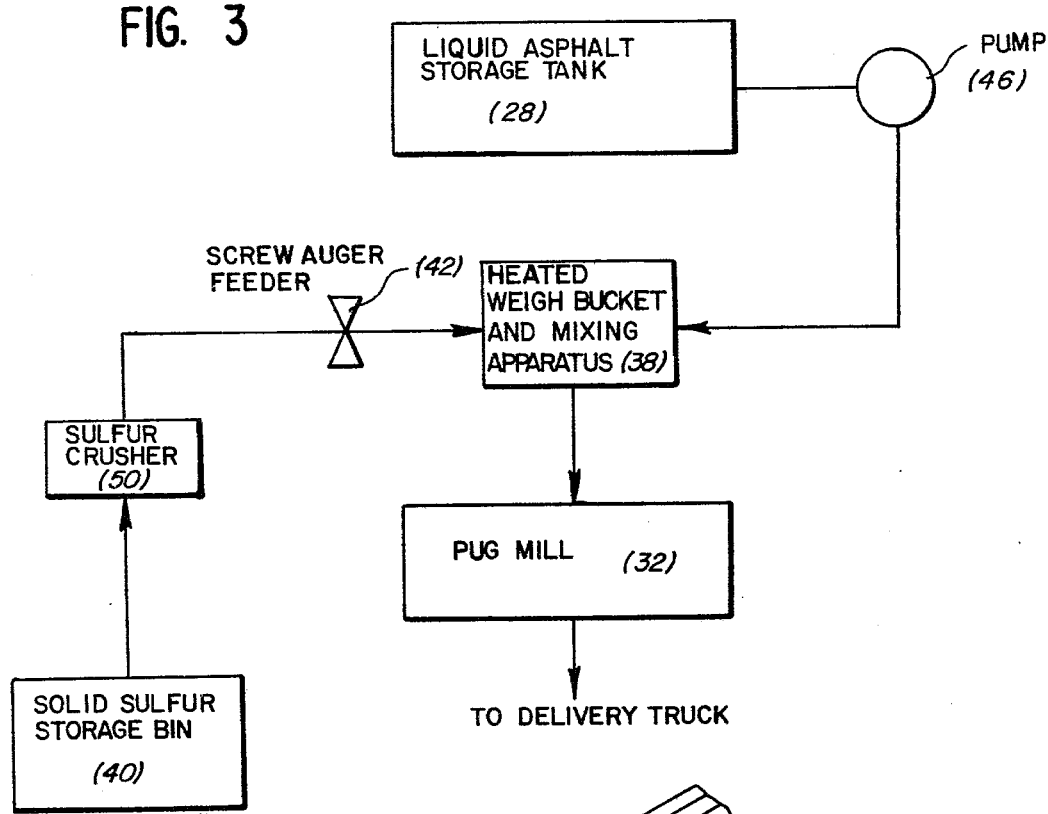
FIG. 3 is a block diagram of the solid sulfur-related apparatus of the present invention.

FIG. 3 depicts in block diagram form the special equipment needed then to modify an existing asphalt batch plant, such as that of FIGS. 1 and 2, so as to accommodate the solid sulfur-extended asphalt process of the present invention. As shown there, the liquid asphalt 29 is pumped from the asphalt storage tank 28 by a pump 46 into the plant's heated asphalt weigh bucket 38. There, due to the hot-oil jacket heating of the weigh bucket 38, the liquid asphalt 29 is brought up to a temperature of approximately 300° F. Further, solid sulfur 41 from the sulfur storage bin 40 is first pulverized by the crusher 50 and then transported by the auger feeder 42 into the plant's asphalt weigh bucket 38. Operation of the mixing apparatus 54 within the weigh bucket 38 causes the crushed solid sulfur to be quickly melted and uniformly dispersed throughout the liquid asphalt. A uniform blend of sulfur-extended asphalt is then obtained. This blend of sulfur-extended asphalt is then placed into the pugmill 32. In a well known fashion, the aggregate weigh hopper 39 is similarly filled with appropriate amounts of the various aggregate materials. These materials are each proportioned, weighed, and then placed into the pugmill 32. After mixing all ingredients in the pugmill, the finished solid sulfur-extended asphalt mix is delivered to the laydown site and compacted into pavement.

It will be understood that, in relation to FIG. 4, the preferred embodiment of mixing apparatus 54 (stirrer mechanism comprising shaft 56, motor 60, and paddles 62) can be replaced by any other well-known type of mixing apparatus. The only requirement is that some form of mixing action occur within the heated asphalt weigh bucket 38 so as to promote melting and pre-blending of the solid sulfur within the asphalt prior to mixing with heated aggregate in the pugmill 32. Further, it will be understood that conventional heated weigh buckets of existing asphalt batch plants can be readily retrofitted with the mixing apparatus 54 and auger feeder mechanism 42.

From the foregoing, it is believed that those skilled in the art will readily appreciate the unique features and advantages of the present invention over previous bituminous concrete compositions made with sulfur-extended asphalt and the methods and apparatus for making the same. Further, it is to be understood that while the present invention has been described in relation to a particular preferred embodiment as set forth in the accompanying drawings and as above described, the same nevertheless is susceptible to change, variation and substitution of equivalents without departure from the spirit and scope of this invention. It is therefore intended that the present invention be unrestricted by the foregoing description and drawings, except as may appear in the following appended claims.

I claim:

1. A method of making bituminous concrete having a sulfur-extended asphalt binder comprising the steps of:
heating liquid asphalt cement to a temperature of at least 300° F. but less than 305° F.;
adding solid sulfur in substantially crushed form to the heated asphalt cement on substantially a 1:1 weight basis;
pre-blending the solid sulfur and asphalt cement together while transferring from the asphalt cement to the sulfur a major portion of the heat required to melt the sulfur until the sulfur has been melted and dispersed throughout the asphalt cement, and adding heat during the pre-blending step or as required to maintain the temperature above the melting point of sulfur;
heating aggregate in a drying apparatus to a maximum temperature of 305° F; and
introducing the liquid blend of sulfur and asphalt cement into the heated aggregate to form bituminous concrete, the amount of asphalt being less than 3.1% by weight of the bituminous concrete.

2. The method of claim 1, and selectively varying the binder content of the bituminous concrete to obtain desired paving lay down criteria so as to assure use of the 1:1 by weight addition of solid sulfur to asphalt cement.

3. The method of claim 1, and compacting the final mixture prior to cooling to form a layer of bituminous concrete pavement.

4. The method of claim 1, and heating the aggregate to a temperature of no more than 305° F., whereby when the solid sulfur is added to and blended with the heated asphalt cement, substantially no harmful sulfur-related gas emissions are produced.

5. The method of making a sulfur-extended asphalt composition, comprising the steps of:
  heating asphalt cement to a temperature of at least 300° F. but less than 305° F.;
  adding solid sulfur in a substantially crushed form to the heated asphalt cement on substantially a 1:1 weight basis;
  utilizing the heat present in the heated asphalt cement to provide a major portion of the heat required to melt the solid sulfur;
  pre-blending the melted sulfur and asphalt cement together into a substantially homogeneous mixture while adding heat to maintain the temperature of the mixture above the melting point of sulfur; and
  mixing the blended mixture of sulfur and asphalt cement with heated aggregate, the asphalt being less than 3.1% by weight of the resulting bituminous concrete.

6. The invention of claim 5, and selectively adjusting the binder content of the resulting asphalt composition to obtain desired lay down characteristics, thereby allowing use of the 1:1 by weight addition of solid sulfur to asphalt cement.

7. A bituminous concrete mix having a sulfur-extended asphalt binder, comprising in combination:
  solid sulfur being by weight between 2.0 and 2.75% of the total bituminous concrete mix;
  liquid asphalt having a temperature of less than 305° F. being by weight no more than 3.1% of the total bituminous concrete mix, the solid sulfur and liquid asphalt being present on substantially a 1:1 weight basis; and
  heated aggregate having a temperature of less than 305° F. including fillers being by weight between 93 and 95% of the total bituminous concrete mix.

* * * * *